United States Patent
El Euch et al.

(10) Patent No.: US 12,445,276 B2
(45) Date of Patent: Oct. 14, 2025

(54) QUANTUM CONSENSUS PROTOCOL FOR MANAGING QUANTUM BLOCKCHAINS

(71) Applicant: Abu Dhabi University, Abu Dhabi (AE)

(72) Inventors: Hichem El Euch, Abu Dhabi (AE); Mohammed Abdellatif Abdelaal Zidan, Assuit (EG); Montasir Yousouf Abdallah Qasymeh, Abu Dhabi (AE); Ashraf Khalil, Abu Dhabi (AE)

(73) Assignee: Abu Dhabi University, Abu Dhabi (AE)

( * ) Notice: Subject to any disclaimer, the term of this patent is extended or adjusted under 35 U.S.C. 154(b) by 174 days.

(21) Appl. No.: 18/130,449

(22) Filed: Apr. 4, 2023

(65) Prior Publication Data
US 2024/0340167 A1    Oct. 10, 2024

(51) Int. Cl.
*H04L 9/00* (2022.01)
*G06N 10/20* (2022.01)
*H04L 9/08* (2006.01)

(52) U.S. Cl.
CPC .......... *H04L 9/0852* (2013.01); *G06N 10/20* (2022.01); *H04L 9/50* (2022.05)

(58) Field of Classification Search
None
See application file for complete search history.

(56) References Cited

U.S. PATENT DOCUMENTS

| | | | |
|---|---|---|---|
| 2019/0019102 A1* | 1/2019 | Babbush | G06F 17/10 |
| 2020/0119748 A1* | 4/2020 | Lucarelli | H03M 13/11 |
| 2022/0156444 A1* | 5/2022 | Noh | G06F 30/3308 |
| 2022/0156622 A1* | 5/2022 | Putterman | G06N 10/20 |
| 2022/0366287 A1* | 11/2022 | Hendrickson | G06N 10/40 |
| 2024/0020563 A1* | 1/2024 | Akhalwaya | G06N 10/20 |

* cited by examiner

*Primary Examiner* — Raqiul A Choudhury (57) ABSTRACT

A quantum method, receives by a quantum circuit, quantum information from a first block within a blockchain. The quantum method performs quantum voting in each node in the quantum blockchains. The quantum method uses entanglement capabilities for achieving consensus voting.

9 Claims, 11 Drawing Sheets

| Item | Size (qubits) | Description |
|---|---|---|
| $\lvert QD\rangle$ | $m$ | Used to store the data of the blocks of the quantum distributed ledger. |
| $\lvert QH\rangle$ | $k$ | Used to store the hash of the blocks of the quantum distributed ledger. |
| $\lvert qD\rangle$ | $h \leq m$ | Used to define the criteria of a block's data that is needed to proof its work. |
| $\lvert qH\rangle$ | $g \leq k$ | Used to define the criteria of a block's hash that is needed to proof its work. |
| $\lvert CS\rangle$ | 1 | Used to mark by entanglement the designated nodes in the network |
| $\lvert dt\rangle$ | 1 | Used to quantify the degree of entanglement in each validator node. |
| $\lvert Ck\rangle$ | 1 | Used to encode the total voting result among leader nodes in the validator set. |
| $\lvert vq\rangle$ | 1 | Used with the qubit $\lvert Ck\rangle$ to decode the final voting result in consensus. |
| $\lvert LNd\rangle$ | 1 | Used to control the $\sqrt[v]{NOT}$ gate, or the gate $\sqrt[v]{H}$ |

QUANTUM CONSENSUS PROTOCOL FOR MANAGING QUANTUM BLOCKCHAINS

BACKGROUND

A blockchain is a type of distributed ledgers that are securely linked via cryptographic hashes. Every block within the blockchain has a cryptographic hash, associated with the previous block in the blockchain, a timestamp, and transaction data. As each block contains information from the previous block, a chain is created. However, there is no current system or process that validates a hash for a particular block by using a quantum circuit. Consensus protocols play significant roles for performing authority via blockchain nodes.

DETAILED DESCRIPTION OF PREFERRED EMBODIMENTS

The following detailed description refers to the accompanying drawings. The same reference numbers in different drawings may identify the same or similar elements.

Systems, devices, and/or methods described herein may provide for one or more quantum circuits to perform consensus voting in quantum blockchains. By doing so, the systems, devices, and/or methods result in greater tamper resistance (i.e., less electronic hacking) of the linkage of the blocks because the hash (such as associated with a fixed output of a particular length of bits) of each block is part of the hash of the following block. Thus, any changes in the chain will affect the final proof-of-work hash as well as all block hashes in between.

Thus, in embodiments, a quantum circuit may perform a Proof of Stack (POS) consensus to prevent such tampering. In embodiments, the proposed quantum consensus search algorithm detects pseudo blocks (e.g. block that can be tampered by electronically/quantum via hacking) in the distributed ledgers by consensus voting. In embodiments, each node in the validators set validates a block's hash of a given block that is stored in the basis state with a block's hash that is sorted in the probability amplitude. If the affirmative votes result is 51% at least in consensus then block at hand is valid; otherwise, it is invalid if the affirmative vote results are less than 51%.

In embodiments, the blockchain is a distributed ledger that stored in each node as follows:

$$|Qledger\rangle = \sum_{i=1}^{M} \sqrt{\frac{H_i}{M}} |QD_i, QH_i, QBH_{i-1}\rangle \quad \text{(equation 1)}$$

where each basis state stores one block of the blockchain blocks. In embodiments, the register |QD⟩ is of size m qubits that stores data of the block which has index i. In embodiments, the register |QH⟩ is of size k which is used to store the hash of a current block, which has index i, in binary system. In embodiments, the register |QBH⟩ is of size k which is used to store the hash of a previous block, which has i−1 in binary system such that if i−1=0 then |BPH$_{i-1}$⟩ refers to that the current block is the genesis block. Thus, the probability amplitude of each block is $$\sqrt{\frac{H_i}{M}}$$

where $H_i$ the hash of the current block. In embodiments, the hash of a current block has an index i, in decimal system such that M is a predefined number assigning the number of the blocks allowed to be stored in a quantum ledger.

In embodiments, each node |NA⟩ in the network stores a quantum ledger in the form of $$\sum_{i=1}^{M} \sqrt{\frac{H_i}{M}} |QD_i, QH_i, QBH_{i-1}\rangle.$$

In embodiments, the hash value of each block depends on the data of each block. Accordingly, when a hacker attempts to electronically/quantum tampers a block's data, they may be able to tamper a block's hash that is stored in the basis state but they will not be able tamper the block's hash that is stored in the probability amplitude.

Furthermore, an example quantum circuit performs a Proof of Stack (POS) consensus. In embodiments, an example quantum consensus is a protocol that verifies blocks in the distributed ledgers by consensus voting. In embodiments, each node in the validators set validates a block's hash of a given block that is stored in the basis state and compares it with a block's hash that is sorted in the probability amplitude. If the affirmative votes result is 51% at least in consensus then block at hand is valid; otherwise, if the affirmative votes result is less than 51%, then the block is considered to be invalid.

Figure 1:
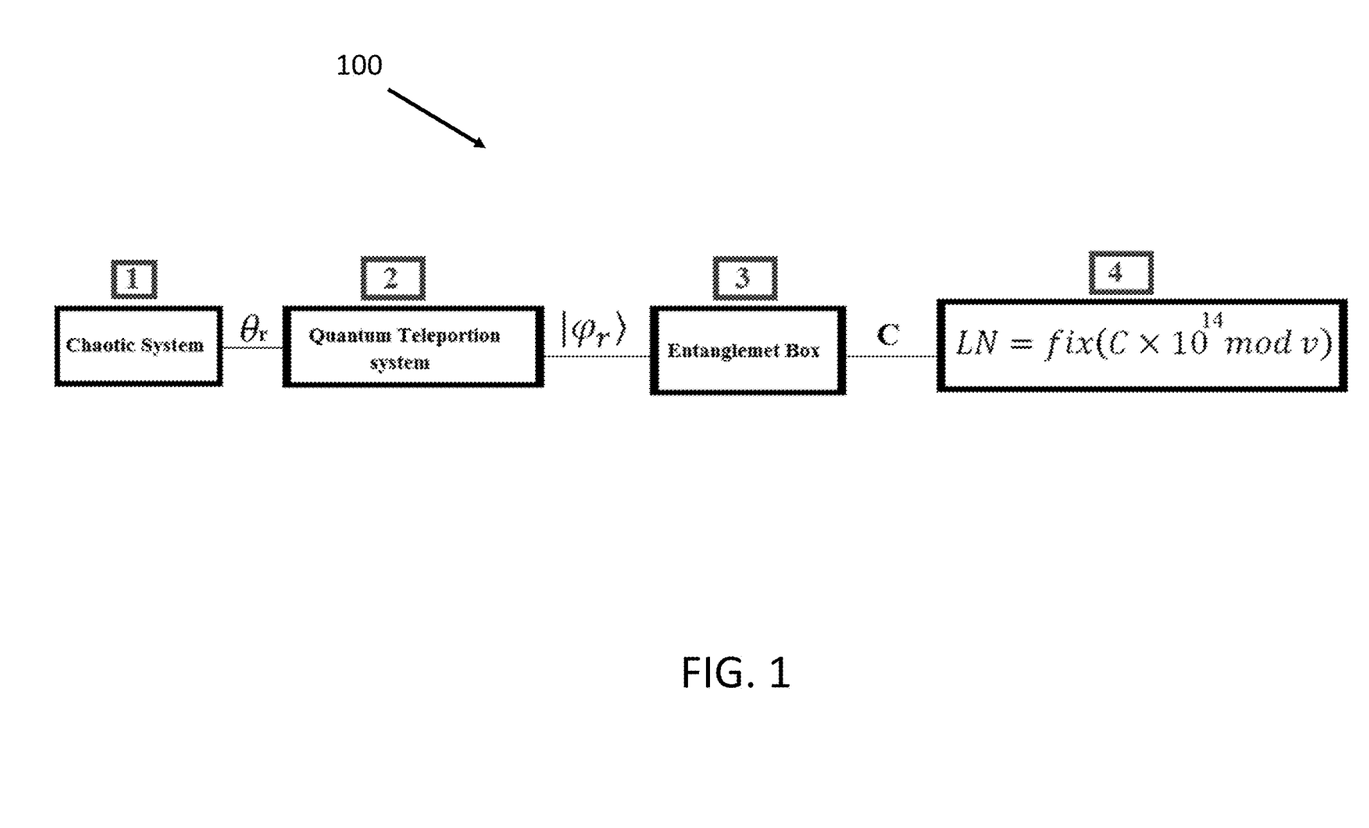
FIG. 1 is a diagram of an example quantum circuit.

FIG. 1 is an example quantum circuit 100 that is used for validating nodes. In embodiments, for a set of v validating nodes in the quantum blockchain, the next leader node is elected randomly using the current leader node from v validating nodes by using an encrypted quantum random generator system that is described in FIG. 1. As shown in FIG. 1, four operations are described that can be used by the current leader node to randomly choose the next leader node LN from the validator set.

In embodiments, for FIG. 1, the first operation is performed using a chaotic system such as a logistic map, or chaotic Boolean functions, that generates a random value $\theta_r$. As shown in FIG. 1, in the second operation, the quantum teleportation system encodes $\theta_r$ in a qubit in the form of:

$$|\varphi_r\rangle = \cos\frac{\theta_r}{2}|0\rangle + \cos\frac{\theta_r}{2}|1\rangle.$$

In embodiments, the quantum teleportation system teleports |φ$_r$⟩ to every other v−1 nodes in the validation set. In embodiments, as shown in FIG. 1, in the third operation, each node in the validation set receives the qubit |φ$_r$⟩, and use it to create an entanglement system, of two qubits, by applying CNOT gate between the qubit |φ$_r$⟩ as a control qubit and a target qubit that is initialized in the state |0⟩; and, then each node in the validators set quantifies the degree of entanglement using the concurrence measure C. Finally, in step four shown in FIG. 1, each one of v−1 nodes recognize (e.g., knows, is aware, etc.) the selected leader node LN as follows:

$$LN = \text{fix}\left(C \times 10^{14} \text{mod} v\right).$$

Figure 2:
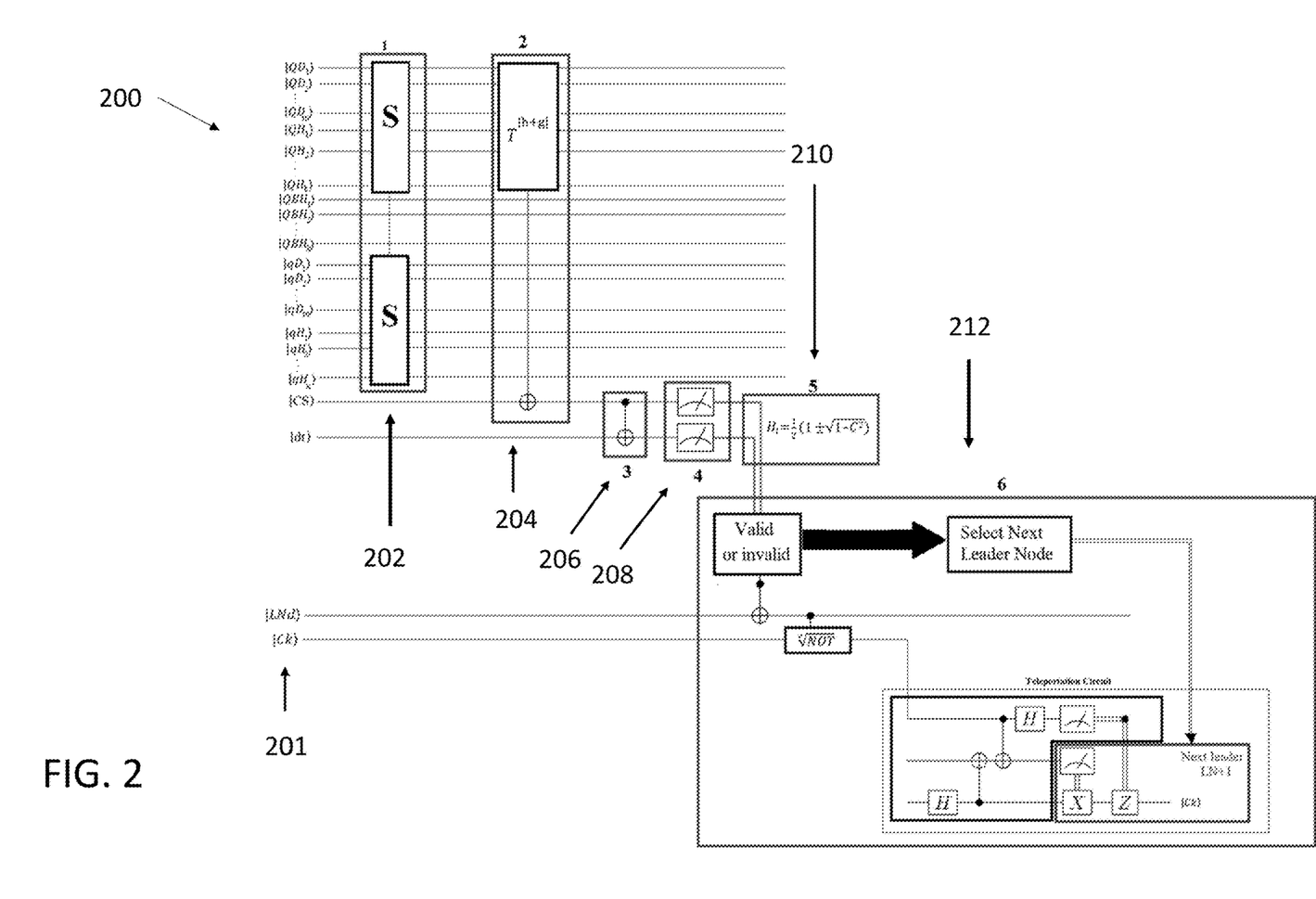
FIG. 2 is a diagram of an example quantum circuit.
Figure 3:
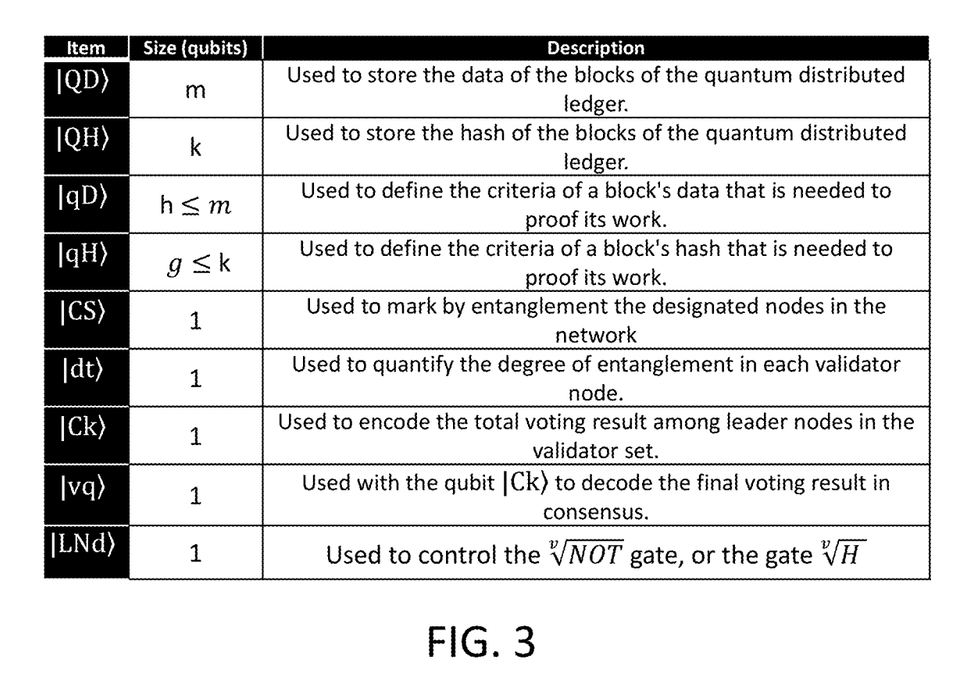
FIG. 3 is a diagram of an example table.
Figure 4:
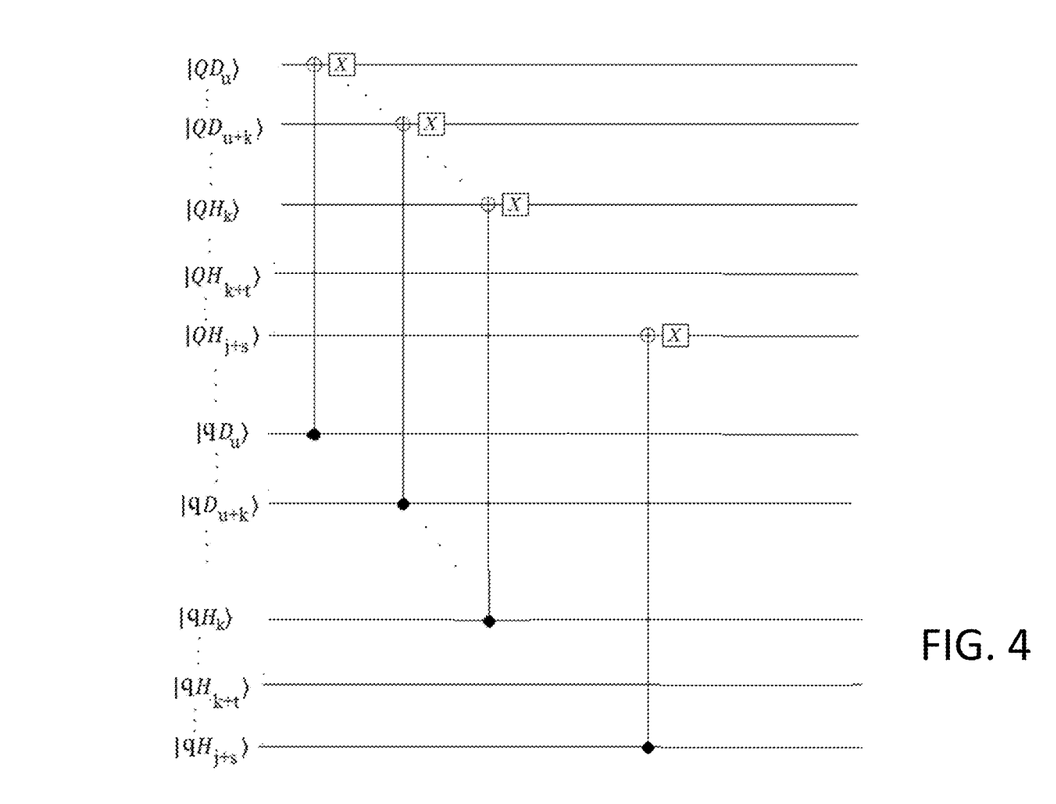
FIG. 4 is a diagram of an example quantum circuit.

FIG. 2 shows an example quantum circuit 200 that is used by the current leader node which is selected (from step four described in FIG. 1) to apply PoS consensus algorithm in steps 1 to 4 (shown as steps 202 to 208). FIG. 3 shows an example table that describes the information provided in section 201 of FIG. 2. At step 1 (step 202), the current leader node applies the S operator between a set h of given qubits from the register |qD⟩ or/and a set g of given qubits from the registers |qH⟩ as control qubits and the corresponding qubits, the same indices, of the registers |QD⟩, or/and |QH⟩, respectively, as target qubits. In embodiments, the S operator consists of a set of size |h+g| of CNOT gates, followed by a set of size quantum NOT gates, where |h+g| represents the total number of the given qubits of in two sets h, and g. FIG. 4 shows the action of the operator S. In embodiments, step 1 transforms the state of each target qubit to state |1⟩ only if the control qubit has the same state.

As shown in FIG. 2, at step 2 (204), a Toffoli gate $T_{QD_hQH_gCS}^{|h+g|}$ that is controlled by |h| qubits of the register |QD⟩, and |g| of the register |QH⟩, and the target qubit is |CS⟩. In embodiments, the qubit |CS⟩ is initialized in the state |0⟩ and is filliped to the state |1⟩ only if the state of each qubit of control qubits is in the state|1⟩. In embodiments, step 2 (204) marks by entanglement the target block that is stored in the superposition that stores the quantum ledger, quantum blockchain, in the current leader node.

As shown in FIG. 2, at step 3 (206), a CNOT gate is applied between the two qubits |CS⟩, and |dt⟩ as control and target qubits, respectively, such that the qubit |dt⟩ is initialized in the state |0⟩. Thus, step 3 creates entanglement between the two qubits |CS⟩|dt⟩ with degree of entanglement, C, depends on the state of the qubit |CS⟩.

As shown in FIG. 2, at step 4 (208), a measurement of the degree of entanglement between the two qubits |CS⟩|dt⟩, is conducted based on using the concurrence measure C. In embodiments, the concurrence measure C for the two qubits a|00⟩+b|11⟩ is C=2|ab|.

In addition to the four steps (202 to 208) are shown in FIG. 2, two additional steps are further described. At step 5 (210), the hash $H_i$ of $i^{th}$ block is $$H_i = \frac{1}{2}\left(1 \pm \sqrt{1-C^2}\right),$$

where $H_i$ is the hash of the $i^{th}$ block that is encoded in the probability amplitude $$\sqrt{\frac{H_i}{M}}$$

as explained in equation (1). Furthermore, at step 6 (212) if Binary $(H_i)$=$BH_i$ then the leader node LN performs: (i) it decides that this block is valid in this node, and it sets the qubit |LNd⟩=|1⟩; and (ii) then the gate $$\text{controlled} - \sqrt[x]{NOT}$$

gate, or $$\text{controlled} - \sqrt[x]{H}$$

gate is activated such that the control qubit is |LNd⟩, and the target qubit is |Ck⟩; (iii) applies the selection step to determine the next leader node among the validator nodes; and (iv) the current leader node teleports the qubit |Ck⟩ to the next leader using quantum teleportation circuit. Alternatively then the current leader node performs: , (i) it decides that this block is in valid in this node, and it sets the qubit |LNd⟩=|0⟩; (ii) then gate $$\text{controlled} - \sqrt[x]{NOT}$$

gate, or $$\text{controlled} - \sqrt[x]{H}$$

gate is deactivated; (iii) applies the selection step to determine the next leader node among the validator nodes; and (iv) the current leader node teleports the qubit |Ck⟩ to the next leader using quantum teleportation circuit (or quantum system teleportation such as quantum satellite). In embodiments, a function Binary $(H_i)$ transforms $H_i$ from integer to binary.

Figure 5:
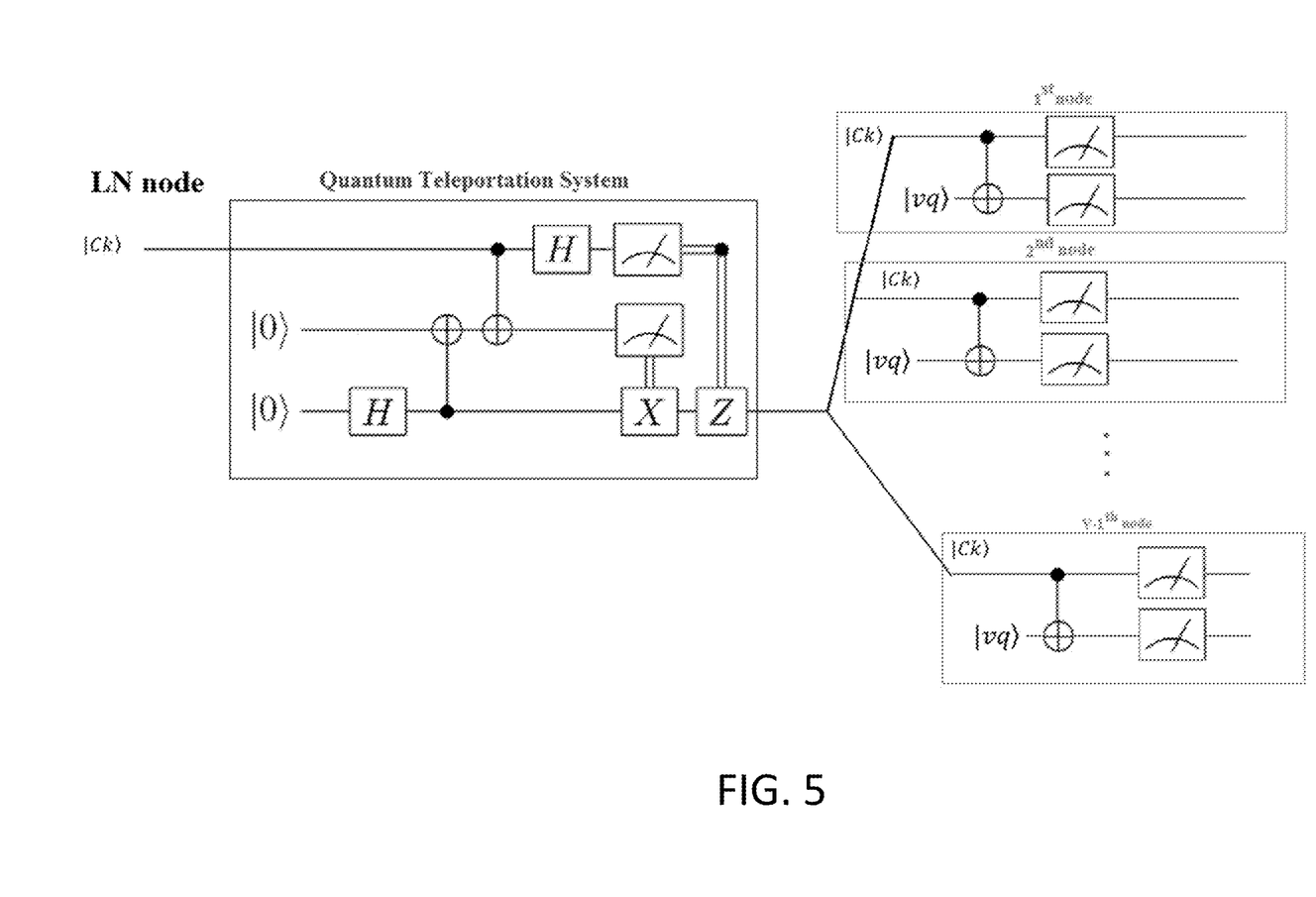
FIG. 5 is a diagram of an example quantum circuit.

In embodiments, each node among validators set must be elected once as a leader node in each consensus round. As shown in FIG. 5, which is an example quantum circuit, if the current leader node is the last leader node in the validator set, then step 7 occurs (which is the entirety of FIG. 5). (i) The last leader node is teleports the qubit |Ck⟩ to each node in the validator set; (ii) each validator node applies CNOT gate between the qubit |Ck⟩ as a control qubit, and the target qubit |vq⟩, that is initialized in the state |0⟩; (iii) Each validator node measures the degree of entanglement between the two qubits |Ck⟩|vq⟩, using the concurrence measure; (iv) the number of affirmative votes $V_d$ is $$V_d = \frac{v}{2}\left(1+\sqrt{1-C^2}\right):b>a$$

$$V_d = \frac{v}{2}\left(1-\sqrt{1-C^2}\right):a\geq b,$$

where a, b in these formulas are the probability amplitudes of the states |00⟩, and |11⟩, of |Ck⟩|vq⟩, in each node, and the concurrence C=2|ab|. Accordingly, if $$V_d \geq \left\lfloor\frac{v}{2}\right\rfloor + 1,$$

then the $i^{th}$ block is valid in consensus, else the $i^{th}$ block is invalid in consensus. Hence each node in the validators set knows the total result of the voting in consensus.

Figure 6:
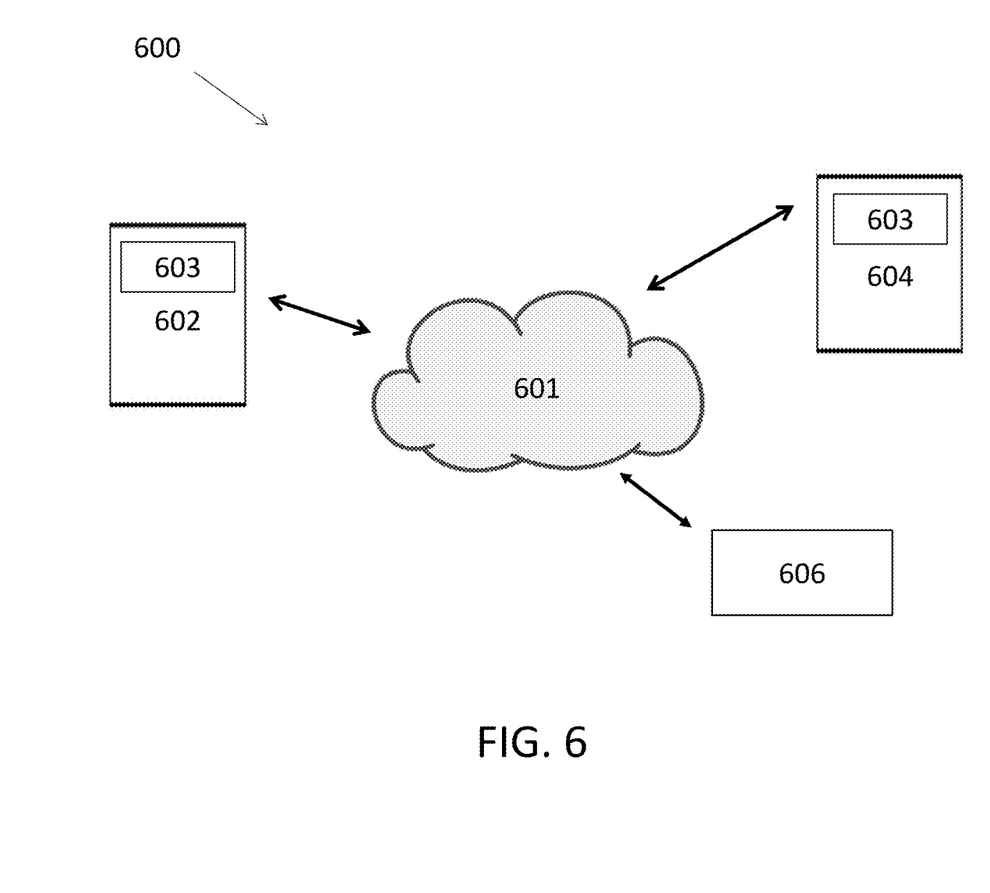
FIG. 6 is a diagram of a computing network environment.

FIG. 6 is a diagram of example environment 600 in which systems, devices, and/or methods described herein may be implemented. FIG. 6 shows network 601, application 603, user device 602, user device 604, and blockchain consensus system 606.

Network 601 may include a local area network (LAN), wide area network (WAN), a metropolitan network (MAN), a telephone network (e.g., the Public Switched Telephone Network (PSTN)), a Wireless Local Area Networking (WLAN), a WiFi, a hotspot, a Light fidelity (LiFi), a Worldwide Interoperability for Microware Access (WiMax), an ad hoc network, an intranet, the Internet, a satellite network, a GPS network, a fiber optic-based network, and/or combination of these or other types of networks. Additionally, or alternatively, network 601 may include a cellular network, a public land mobile network (PLMN), a second generation (2G) network, a third generation (3G) network, a fourth generation (4G) network, a fifth generation (5G) network, and/or another network.

In embodiments, network 601 may allow for devices describe any of the described figures to electronically communicate (e.g., sending blockchains, bitcoins, using emails, electronic signals, URL links, web links, electronic bits, fiber optic signals, wireless signals, wired signals, etc.) with each other so as to send and receive various types of electronic communications.

User device 602 and/or 604 may include any computation or communications device that is capable of communicating with a network (e.g., network 601). For example, user device 602 and/or user device 604 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a desktop computer, a laptop computer, a tablet computer, a camera, a personal gaming system, a television, a set top box, a digital video recorder (DVR), a digital audio recorder (DUR), a digital watch, a digital glass, or another type of computation or communications device.

User device 602 and/or 604 may receive and/or display content. The content may include objects, data, images, audio, video, text, files, and/or links to files accessible via one or more networks. Content may include blockchains and/or other types of distributed ledgers. Content may include a media stream, which may refer to a stream of content that includes video content (e.g., a video stream), audio content (e.g., an audio stream), and/or textual content (e.g., a textual stream). In embodiments, an electronic application may use an electronic graphical user interface to display content and/or information via user device 602 and/or 604. User device 602 and/or 604 may have a touch screen and/or a keyboard that allows a user to electronically interact with an electronic application. In embodiments, a user may swipe, press, or touch user device 602 and/or 604 in such a manner that one or more electronic actions will be initiated by user device 602 and/or 604 via an electronic application.

User device 602 and/or 604 may include a variety of applications, such as, for example, a blockchain-based application, an e-mail application, a telephone application, a camera application, a video application, a multi-media application, a music player application, a visual voice mail application, a contacts application, a data organizer application, a calendar application, an instant messaging application, a texting application, a web browsing application, a blogging application, and/or other types of applications (e.g., a word processing application, a spreadsheet application, etc.). In embodiments, user device 602 and/or 604 may receive blockchains without using an associated application (such as electronic application 603).

Electronic application 603 may be capable of interacting with user device 602, user device 604, and/or blockchain consensus system 606 to automatically and electronically receive electronic information for one or more persons. In embodiments, electronic application 603 may be electronically configured to validate a hash associated with a blockchain (as described in FIGS. 1-5). While FIG. 6 shows electronic application 603 on user device 602 and user device 604, some or all the electronic processes performed by electronic application 603 may be stored by blockchain consensus system 606.

Blockchain consensus system 606 may include one or more computational or communication devices that gather, process, store, and/or provide information relating to one or more electronic pages associated with electronic application 603 that is searchable and viewable over network 601. In embodiments, blockchain consensus system 606 may include one or more servers. In embodiments, the one or more servers of blockchain consensus system 606 may include one or more databases. In embodiments, blockchain consensus system 606 may validate one or more hashes based on information from electronic application 603.

Figure 7:
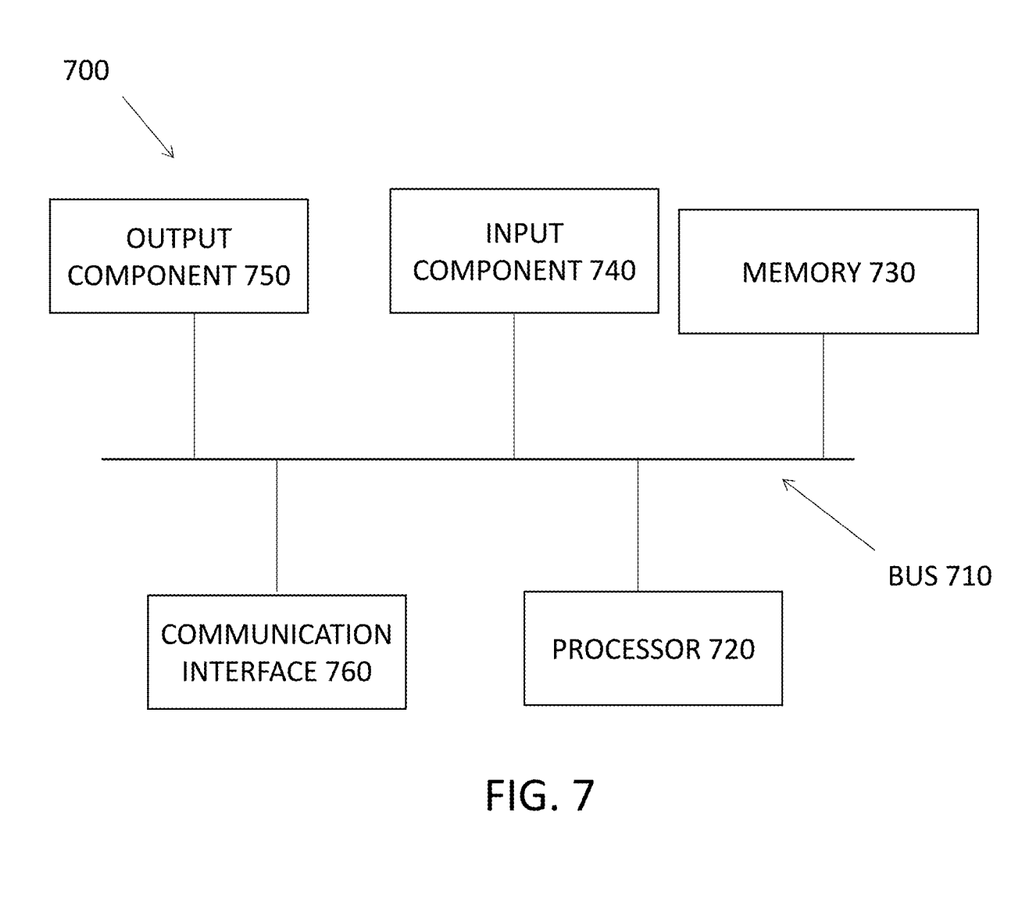
FIG. 7 is a diagram of an example computing device.

FIG. 7 is a diagram of example components of a device 700. In embodiments, the blockchain/distributed ledger descriptions may be stored across multiple devices 700. Device 700 may correspond to a computing device, such as devices that may use circuit 100. As shown in FIG. 7, device 700 may include a quantum bus 710, a processor 720, a memory 730, quantum input component 740, quantum output component 750, and a communications interface 760. In other implementations, device 700 may contain fewer components, additional components, different components, or differently arranged components than depicted in FIG. 7. Additionally, or alternatively, one or more components of device 700 may perform one or more tasks described as being performed by one or more other components of device 700.

Bus 710 may include a path that permits communications among the components of device 700. Processor 720 may include one or more processors, microprocessors, and/or processing logic (e.g., a field programmable gate array (FPGA), quantum teleportation devices, quantum communication devices, quantum computing circuits, quantum encryption applications and/or an application specific integrated circuit (ASIC) that interprets and executes instructions. Memory 730 may include any type of dynamic storage device that stores information and instructions, for execution by processor 720, and/or any type of non-volatile storage device that stores information for use by processor 720. Input component 740 may include a mechanism that permits a user to convert classical information to quantum input information to device 700, such as a quantum circuit, a quantum-based application, a keyboard, a keypad, a button, a switch, voice command, etc. Output component 750 may include a mechanism that outputs information and transforms quantum information to classical information to be provided to the user, such as a display, a speaker, one or more light emitting diodes (LEDs), etc.

Communications interface 760 may include any transceiver-like mechanism that enables device 700 to communicate with other devices and/or systems. For example, communications interface 760 may include an Ethernet interface, an optical interface, a coaxial interface, a wireless interface, or the like and quantum-to-classical and vice versa unit.

In another implementation, communications interface 760 may include, for example, a transmitter that may convert baseband signals from processor 720 to radio frequency (RF) signals and/or a receiver that may convert RF signals to baseband signals. Alternatively, communications interface 760 may include a transceiver to perform functions of both a transmitter and a receiver of wireless communications (e.g., radio frequency, infrared, visual optics, quantum wireless, quantum channels, quantum fiber optics, quantum teleportation, quantum communication devices/networks, quantum encryption devices, etc.), wired communications (e.g., conductive wire, twisted pair cable, coaxial cable, transmission line, fiber optic cable, waveguide, single-photon channels, multi-photon channels, etc.), or a combination of wireless and wired communications.

Communications interface 760 may connect to an antenna assembly (not shown in FIG. 7) for transmission and/or reception of the RF signals, and/or quantum channels. The antenna assembly may include one or more antennas to transmit, quantum channels and/or receive RF signals over the air. The antenna assembly may, for example, receive RF signals and/or quantum information from communications interface 760 and transmit the RF signals over the air, and receive RF signals over the air and provide the RF signals to communications interface 760. In one implementation, for example, communications interface 760 may communicate with a network (e.g., a wireless network, quantum network, quantum channel, wired network, Internet, quantum internet, etc.). In embodiments, an antenna may be implemented by quantum teleportation protocols, quantum communication protocols and/or quantum encryption protocols.

As will be described in detail below, device 700 may perform certain operations. Device 700 may perform these operations in response to processor 720 executing software instructions (e.g., computer program(s)) contained in a computer-readable medium, such as memory 330, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 730 from another computer-readable medium or from another device. The software instructions contained in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

Figure 8:
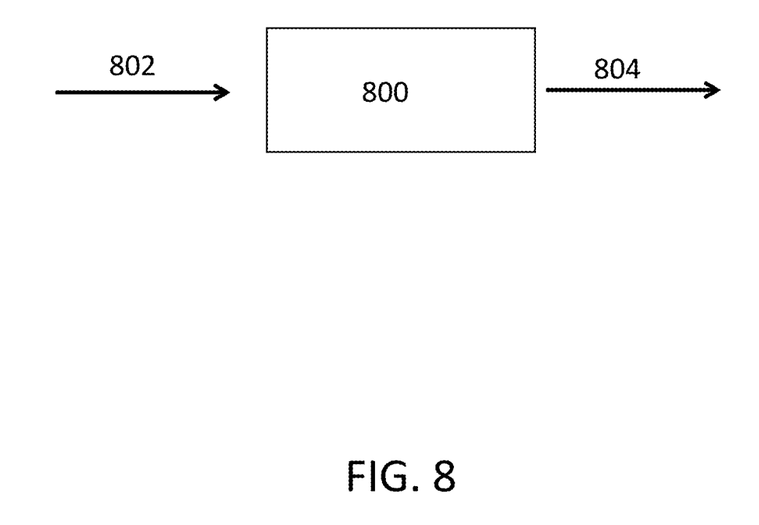
FIG. 8 is a diagram of an example computing device.

FIG. 8 is an example diagram of a computing device 800. FIG. 8 describes device 800, input 802, and output 804. In embodiments, device 800 may a computing device with features/structures similar to that described in FIG. 8. In embodiments, device 800 may be a computing device that is part of a laptop, desktop, tablet, smartphone, quantum computer, quantum computing device, quantum communication device, quantum teleportation device, quantum encryption device, quantum internet device, and/or any other device.

In embodiments, device 800 may receive communication 802, analyze communication 802, and generate output 804.

Figure 9:
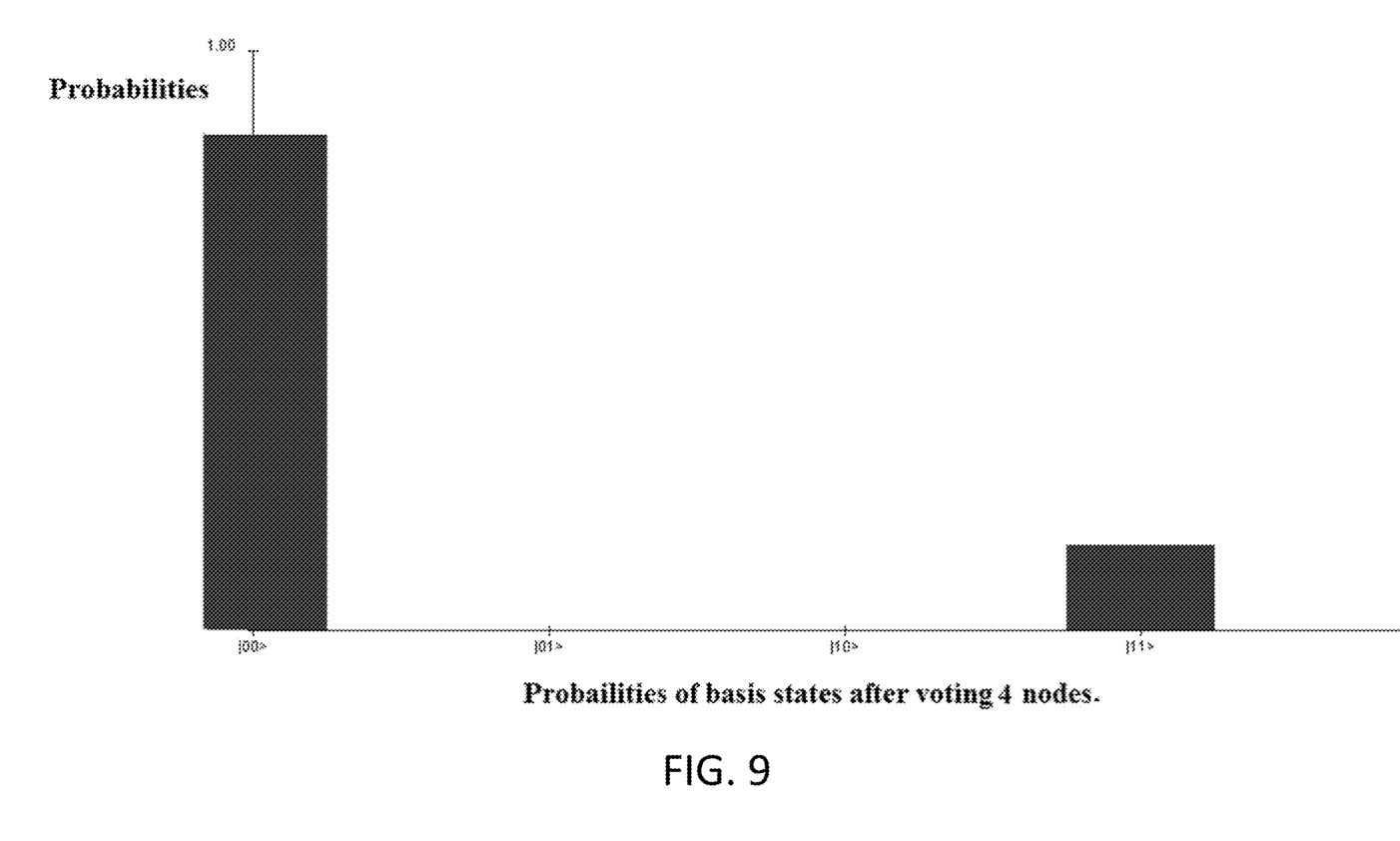
FIGS. 9, 10, and 11 are example graphs.
Figure 10:
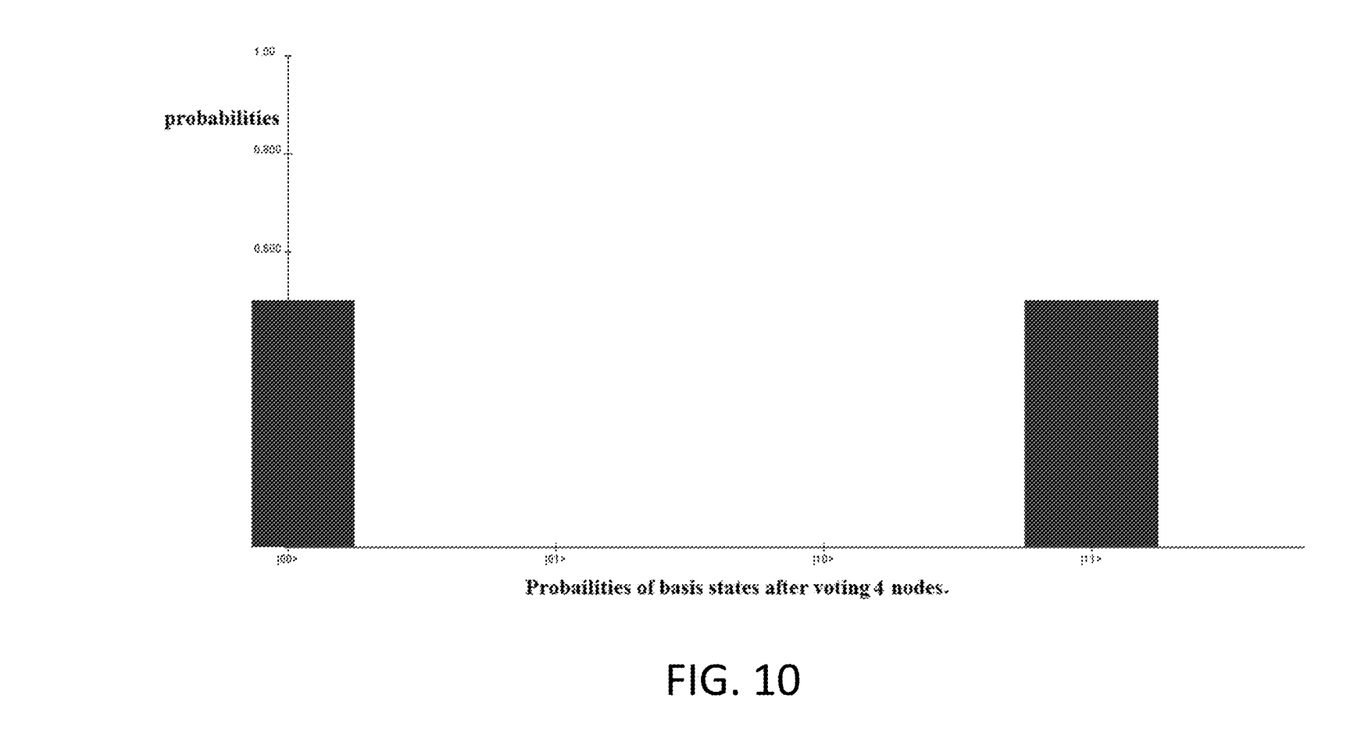
Figure 11:
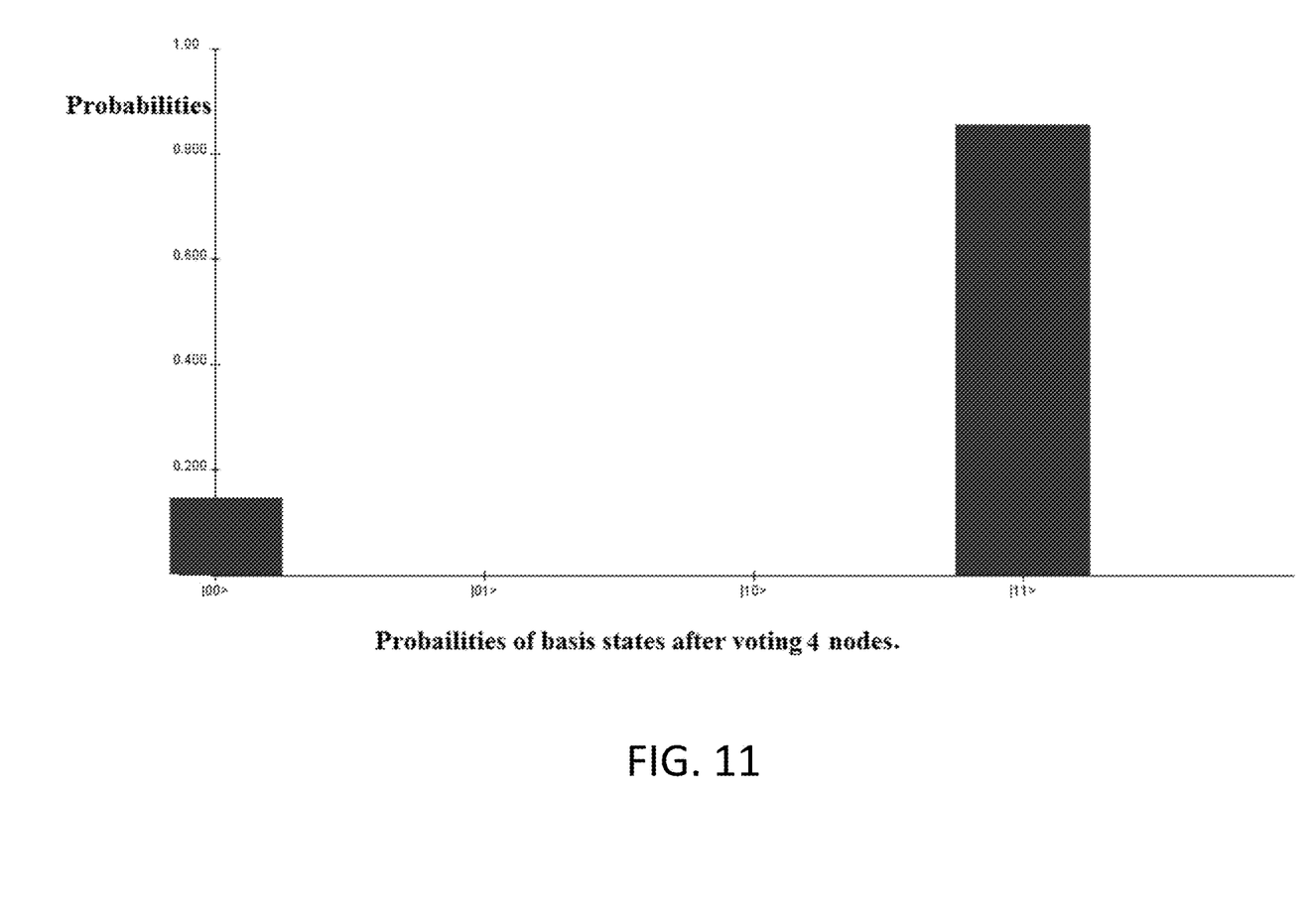

FIGS. 9, 10, and 11 describe example graphs that are example simulations of the quantum circuits described in the above figures. In embodiments, such simulations may be generated by a computing software that can simulate the features of a quantum circuit such as those described in FIGS. 1, 2, 4, and 5. In embodiments, each performed simulations is using four nodes within a blockchain. Other simulations may include fewer or greater nodes. FIG. 9 shows the probabilities of the states $|00\rangle$, $|11\rangle$ for the two qubits $|Ck\rangle|vq\rangle$, are 0.748, 0.252, respectively. Accordingly, C=0.376992, and the consensus voting results is 1.0080≈1 affirmative votes. FIG. 10 shows the probabilities of the states $|00\rangle$, $|11\rangle$ for the two qubits $|Ck\rangle|vq\rangle$, are 0.482, 0.518, respectively. Accordingly, C=0.9994, and the consensus voting results is 2.0720≈2 affirmative votes. FIG. 11 shows the probabilities of the states $|00\rangle$, $|11\rangle$ for the two qubits $|Ck\rangle|vq\rangle$, are 0.257, 0.743, respectively. Accordingly, C=0.9994, and the consensus voting results is 2.9720≈3 affirmative votes.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While various actions are described as selecting, displaying, transferring, sending, receiving, generating, notifying, and storing, it will be understood that these example actions are occurring within an electronic computing, electronic networking, quantum computing and/or quantum networking environment (such as described in FIG. 6) and may require one or more computing devices, as described in FIG. 7 or FIG. 8 to complete such actions. Furthermore, it will be understood that these various actions can be performed by using a touch screen on a computing device (e.g., touching an icon, swiping a bar or icon), using a keyboard, a mouse, or any other process for electronically selecting an option displayed on a display screen to electronically communicate with other computing devices, quantum computer, cloud quantum circuit/computer, quantum communication devices, quantum teleportation devices, quantum encryption circuit/devices, and/or quantum networks. Also, it will be understood that any of the various actions can result in any type of electronic information and/or quantum information to be displayed in real-time and/or simultaneously on multiple user devices. Any electronic graphs and/or quantum information may be generated by a computing device, such as device 700, and displayed via a graphical user device (GUI) or cloud environment.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A quantum method, comprising:
generating, by a quantum system, a random value;
encoding, by the quantum system, encodes the random value $\theta_r$, wherein random value is encoded in a qubit in the form of $$|\varphi_r\rangle = \cos\frac{\theta_r}{2}|0\rangle + \cos\frac{\theta_r}{2}|1\rangle,$$

sending, by the quantum system, the qubit $|\varphi_r\rangle$ to each node in a validation set, wherein the qubit $|\varphi_r\rangle$ is used by each node to create an entanglement system, of two other qubits, by applying CNOT gate between the qubit $|\varphi_r\rangle$ as a control qubit and an ancilla target qubit that is initialized in a state $|0\rangle$,
wherein each of the node in the validation set quantifies the degree of entanglement using a concurrence measure and wherein each of the nodes recognizes a selected leader node LN, wherein LN=fix ($C \times 10^{14}$ mod v), and wherein the quantum system reduces hacking of linkages between different blocks of the blockchain based on the sending the qubit to each node in the validation set.

2. The quantum method of claim 1 further comprising:
applying, by a current leader node of the quantum system, a S operator between a set h of given qubits from the register $|qD\rangle$ or/and a set g of given qubits from the registers $|qH\rangle$ as control qubits and the corresponding qubits,
wherein the same indices, of the registers $|QD\rangle$, or/and $|QH\rangle$ are target qubits.

3. The quantum method of claim 1, further comprising:
initializing, by the quantum system, a qubit $|CS\rangle$ to a state $|0\rangle$.

4. The quantum method of claim 1, further comprising:
applying, by the quantum system, a $|g|+|h|+1$-qubit Toffoli gate to a number of given qubits from the register $|qD\rangle$ as control qubits or another number of given qubits from the registers $|qH\rangle$ as corresponding qubits; and
setting a target qubit $|CS\rangle$ to a state $|0\rangle$,
wherein the target qubit $|CS\rangle$ is flipped to a state $|1\rangle$ only if a state of each qubit of the control qubits is in the state $|1\rangle$, and
wherein a target block is marked by entanglement, wherein the target block is stored in a superposition that stores a quantum ledger in the current leader node.

5. The quantum system of claim 1, further comprising:
applying, by the quantum system, CNOT gate between the qubit $|CS\rangle$, and a qubit $|dt\rangle$ as control and target qubits, such that the qubit $|dt\rangle$ is initialized in the state $|0\rangle$,
wherein applying the CNOT gate creates entanglement between the two qubits $|CS\rangle$ and $|dt\rangle$ with a degree of entanglement, C.

6. The quantum of claim 1, wherein a measurement of the degree of entanglement between the two qubits $|CS\rangle$ and $|dt\rangle$, is conducted based on using a concurrence measure.

7. The method of claim 1, further comprising:
encoding, by the quantum system, a hash $H_i$ wherein the the hash $H_i$ of $i^{th}$ block is $$H_i = \frac{1}{2}\left(1 \pm \sqrt{1-C^2}\right),$$

where the $H_i$ hash is a hash of the $i^{th}$ block that is encoded in a probability amplitude $$\sqrt{\frac{H_i}{M}}.$$

8. The method of claim 1, further comprising:
determining, by the quantum system, whether binary $(H_i)$=B.

9. The method of claim 1, further comprising:
determining, by the quantum system, that binary $(H_i)$=B then the leader node LN sets the qubit $|LNd\rangle = |1\rangle$ and the $$\text{controlled} - \sqrt[x]{NOT}$$

gate is activated such that the control qubit is $|LNd\rangle$, and the target qubit is $|Ck\rangle$;
applying, by the quantum system, a selection step to determine the next leader node among the validator nodes; and
teleporting, by the quantum system, the qubit $|Ck\rangle$ to the next leader using a quantum teleportation circuit.

* * * * *